Patented Mar. 28, 1939

2,152,132

UNITED STATES PATENT OFFICE 2,152,132

ACETOACETYL AMIDES AND PROCESS FOR THEIR PREPARATION

Albert B. Boese, Jr., Pittsburgh, Pa., assignor to Carbide and Carbon Chemicals Corporation, a corporation of New York No Drawing. Application December 12, 1936, Serial No. 115,532

19 Claims. (Cl. 260—247)

This invention relates to the production of acetoacetyl amides, and more particularly to the production of such compounds by reacting diketene with ammonia, a primary aromatic amine, or a primary or secondary aliphatic amine, in suspension in water.

The production of acetoacetanilide by reacting diketene and aniline, in the presence of a volatile solvent for the reactants which is inert thereto,—such as acetone, toluene, and benzol,—already is known, and is described in U. S. Patent 1,982,675 issued December 4, 1934, to George H. Law.

In view of the tendency for diketene to decompose in the presence of water, the use of water heretofore has been avoided in those processes for the preparation of acetoacetyl derivatives of amines using diketene as a starting material.

While the prior process utilizing a volatile organic solvent for the reactants is satisfactory for the production of acetoacetyl derivatives of certain aromatic amines, especially those which are fairly soluble in the solvent employed, the preparation of similar derivatives of certain other amines, particularly those of the diphenyl series, such as benzidine and tolidine, has proven rather difficult. Thus when using toluene as a solvent, since benzidine and tolidine are relatively insoluble in this solvent at low temperatures, the reaction must be conducted at the boiling point of toluene. This results in the formation of an appreciable amount of byproducts which can be removed only with difficulty. Acetone is not entirely suitable for use as a solvent for large scale production of these compounds since under certain conditions an impure product is secured which does not precipitate completely and is difficult to filter. Moreover, considerable solvent losses are incurred during filtration.

The present invention is based in important part upon the discovery that diketene, when added in suitable manner to an aqueous suspension or solution of a primary aromatic amine or of a primary or secondary aliphatic mono- or poly-amine, or ammonia, reacts preferentially with such amine or ammonia to give very satisfactory yields of the corresponding acetoacetyl derivative of the amine or ammonia, in spite of the known tendency of the diketene to decompose in the presence of water.

According to the present invention, diketene preferably is slowly introduced into, and is rapidly and intimately mixed with an aqueous solution of ammonia, or with a solution or finely-divided suspension in water of a primary aromatic amine, or a primary or secondary aliphatic amine, at a temperature below the boiling point of the mixture, and preferably at or below room temperature. In instances where the amine is normally solid, it is highly desirable to employ it in the form of a powder sufficiently fine to pass through a screen of 60-mesh or finer. The mixture continuously is agitated to insure prompt, uniform contact between the diketene and the amine or ammonia, which react to form the corresponding acetoacetyl derivative, usually in the form of a flocculent solid.

The reaction between the diketene and amine or ammonia preferably is conducted at temperatures well below the boiling temperature of the mixture,—for example, at 50° C. or below; and temperatures of 0° C. or below conveniently may be used to prevent formation of undesirable byproducts, and to facilitate separation of the desired products from the reaction mixture.

The precipitated acetoacetyl derivative of the amine or of ammonia then is separated from the reaction mixture in suitable manner,—as by filtration or the equivalent. The product may be purified by well known means, as by recrystallization from solvents; or by washing with water, followed by air drying. In instances where an amine is employed which is water-insoluble, but is soluble in dilute acids, the reaction mixture may be washed with dilute acid for the removal therefrom of any unreacted amine, prior to the water-washing step.

In instances where the starting material is an amine that is insoluble in caustic alkali, any excess of the former and any caustic-insoluble byproducts of the reaction may be removed from the reaction mixture by adding thereto an amount of caustic alkali sufficient to react with and dissolve the acetoacetyl derivative produced. Thus the said derivative goes into solution, leaving in suspension any unreacted amine and other caustic-insoluble byproducts which are removed by filtration. Thereafter, upon neutralizing the filtrate with an acid,—such as sulfuric, hydrochloric, or acetic acid,—the said derivative precipitates from solution, and is filtered, washed with water, and dried.

Other methods for recovering and purifying the acetoacetyl acid amides from the reaction mixture may be employed, within the spirit of the invention.

The present invention possesses the important advantages that the acetoacetyl amides are readily obtained in relatively pure form, the reaction may be conducted at or around room temperature in open vessels, and the need for the usual expensive equipment for solvent recovery is eliminated.

The following examples serve to illustrate the invention:

*Example I.—Acetoacetanilide*

To a vigorously stirred suspension of 18.6 grams of aniline in 250 cc. of water at 30° C. was added dropwise over a period of one hour, 18 grams of diketene. During the addition the temperature rose to 40° C. and crystalline acetoacetanilide separated. The stirring was continued for one hour more, after which time the product was filtered, washed with a small amount of dilute hydrochloric acid to remove unreacted aniline, and then washed with water and air-dried. There was obtained 24 grams of acetoacetanilide which melted at 83° to 84° C., representing a yield of 68%, based upon the diketene used.

*Example II.—Diacetoacetyl ortho tolidine*

To a vigorously stirred suspension of 212 grams (1 mol) of ortho tolidine (60 mesh) in 6 liters of water at room temperature was added slowly over a period of two hours 185 grams (1.1 mols) of diketene. During this time the suspension became quite thick, due to the formation of diacetoacetyl ortho tolidine, and the temperature rose from 28° to 35° C., external cooling being unnecessary. The mixture was stirred for one hour more, then to it was added a solution of 88 grams of sodium hydroxide in 200 cc. of water. The major part of the solid material dissolved, leaving in suspension a small amount of caustic-alkali insoluble material which was removed by filtration. The filtrate was then neutralized by the addition of 132 grams of glacial acetic acid. In this step other acids such as hydrochloric or sulfuric may be used. Diacetoacetyl ortho tolidine precipitated as a colorless solid which was separated on a filter, washed with water and air-dried. There were obtained 327 grams of this material representing a yield of 86%. The product was a colorless solid which melted at 201° to 202° C. and was completely soluble in caustic soda solution.

*Example III.—Diacetoacetyl benzidine*

To a vigorously agitated suspension of 18.4 grams of benzidine (60 mesh) in 400 cc. of water was added dropwise over a period of two hours at room temperature 18.5 grams of diketene. When the diketene had all been added the resulting thick mixture was stirred for one hour more, then treated with a solution of 9 grams of sodium hydroxide in 50 cc. of water. Most of the solid material dissolved, leaving in suspension a small amount of caustic insoluble material. This was removed by filtration. When the filtrate was neutralized by the addition of 13.5 grams of glacial acetic acid, the reaction product precipitated as a colorless solid. After filtering, washing with water and air-drying there was obtained 25.9 grams of diacetoacetyl benzidine, representing a yield of 82%. The product was an ivory-colored solid which melted at 237° to 238° C. It was completely soluble in caustic soda solution.

Acetoacetyl derivatives of water-soluble amines, both aromatic and aliphatic, may be prepared by the present process, as indicated by the following examples:

*Example IV.—Diacetoacetyl para phenylene diamine*

Thirty-five grams of diketene was slowly added to a vigorously agitated solution of 21.6 grams of para phenylene diamine in 250 cc. of water at 30° C. During the reaction diacetoacetyl para phenylene diamine separated from solution in a crystalline condition. This product was filtered, washed with water and air-dried. There were obtained 46 grams of diacetoacetyl para phenylene diamine as a pearl-grey crystalline solid which melted at 174° to 175° C. This corresponds to a yield of 83%.

*Example V.—Acetoacetyl cyclohexylamine*

To a solution of 44.5 grams of cyclohexylamine in 150 cc. of water at 0° C., was added dropwise with stirring 42 grams of diketene. An exothermic reaction took place, the temperature of the mixture being kept below 20° C. by external cooling. During the reaction an oil separated which partially crystallized. Upon standing at 0° to 10° C., the reaction mixture crystallized to a crystalline mush, which was filtered and air-dried. There was obtained 73.5 grams of crystalline acetoacetyl cyclohexylamine representing a yield of 85%. When recrystallized from petroleum ether, it occurred as colorless needles which melted between 72° and 73° C. Acetoacetyl cyclohexylamine is soluble in alcohols, ketones, and esters, is sparingly soluble in water, and is insoluble in ethers and in aromatic and aliphatic hydrocarbons. The reaction involved is indicated by the equation:

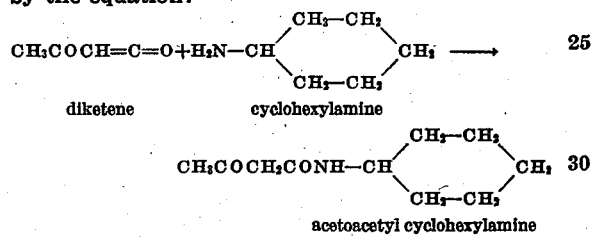

*Example VI.—Acetoacetyl morpholine*

Forty-seven grams of diketene were added slowly with stirring to a solution of 48 grams of morpholine in 250 cc. of water at 0° C. During the reaction the temperature was kept below 15° C. When all the diketene had been added, the water was removed by distillation under a vacuum of from 50 to 100 mm. of mercury, and the residue then was distilled under a high vacuum of around 1 mm. of mercury. There were obtained 87 grams of acetoacetyl morpholine as a colorless syrup which distilled between 124° and 128° C. under a pressure of 1 mm. of mercury. After standing for several hours the product slowly crystallized. When recrystallized from a mixture of benzene and petroleum ether, it occurred as a colorless crystalline compound which melted between 54° and 55° C. Acetoacetyl morpholine is soluble in water, alcohols, ketones, and esters, but insoluble in ethers and petroleum hydrocarbons.

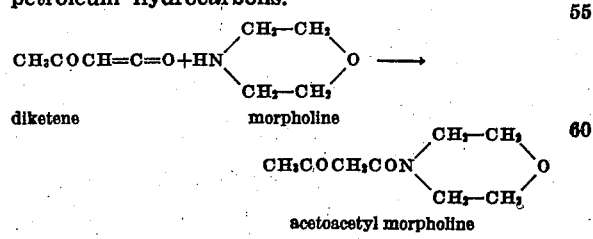

*Example VII.—Acetoacetamide*

To 100 cc. of 28% aqueous ammonia at 0° C., was added slowly with stirring 25 grams of diketene. An exothermic reaction took place, the temperature being kept below 20° C. by external cooling. When the diketene had all been added, the solution was evaporated to dryness on a water bath, and the viscous residue was allowed to stand for several days in a vacuum desiccator over concentrated sulfuric acid. The residue slowly crystallized, yielding 23 grams of acetoacetamide which, after recrystallizing from a mixture of acetone and petroleum ether, was obtained as a colorless crystalline solid melting between 53° and 54° C.

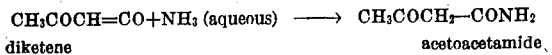

*Example VIII.—Diacetoacetyl ethylene diamine*

To a solution of 30 grams (½ mol) of ethylene diamine in 500 cc. of water at 0° C. was added dropwise with stirring 84 grams (1 mol) of diketene over a period of one hour. During the reaction the product started to crystallize from solution. When the diketene had all reacted, the mixture was filtered yielding 76 grams of a colorless crystalline compound. By concentrating the filtrate to one-third its volume an additional 6.5 grams of material was obtained. The total yield is 72.4%. Diacetoacetyl ethylene diamine is a colorless crystalline compound which melts at 168° to 169° C. It is sparingly soluble in water, alcohols, and ketones, but insoluble in ethers and aliphatic and aromatic hydrocarbons.

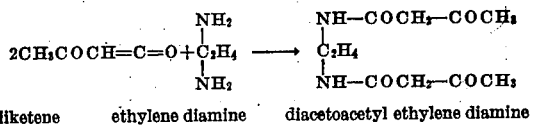

It will be understood that the invention is applicable generally for the production of the acetoacetyl derivatives of the general class of water-soluble and of water-insoluble primary aromatic amines and primary and secondary aliphatic amines; and of ammonia; and that the amines employed may be either solids or liquids under the conditions of their use in the process. In the case of solid water-insoluble amines, these are finely divided by grinding prior to use; whereas with liquid amines vigorous agitation of a water suspension thereof is sufficient to insure good yields of the desired products.

The term "water dispersion" and similar expressions set forth in the claims are intended to designate dispersions maintained in water by suitable agitation as well as true colloidal dispersions or of solutions of the amine or ammonia in water. The term "molecular dispersion" is intended to designate a solution of the active reagent in water.

The invention is susceptible of modification within the scope of the appended claims.

I claim:

1. Process for preparing an acetoacetyl amide, which comprises slowly introducing diketene into and agitating the same with a water dispersion of a nitrogen-containing compound selected from the group consisting of primary aromatic amines, primary and secondary aliphatic amines, and ammonia.

2. Process for the production of an acetoacetyl derivative of an amine, which comprises slowly introducing diketene into and quickly and intimately mixing the same with a water dispersion of an amine.

3. Process for the production of an acetoacetyl derivative of an amine, which comprises slowly introducing diketene into and quickly and intimately mixing the same with a water dispersion of a primary amine.

4. Process for the production of an acetoacetyl derivative of an amine, which comprises slowly introducing diketene into and quickly and intimately mixing the same with a water dispersion of a primary aromatic amine.

5. Process for preparing an acetoacetyl amide which comprises slowly introducing and quickly and intimately mixing successive portions of diketene with a water dispersion of a nitrogen-containing compound selected from the group consisting of primary aromatic amines, primary and secondary aliphatic amines, and ammonia, and separating from the resultant reaction mixture the acetoacetyl amide thus produced.

6. Process for the production of an acetoacetyl amide which comprises slowly introducing diketene into and quickly and intimately mixing the same with a finely-divided suspension in water of a water-insoluble amine, and recovering from the resultant reaction mixture the acetoacetyl amide thus produced.

7. Process for the production of an acetoacetyl amide, which comprises slowly introducing and intimately contacting diketene with an aqueous solution of a water-soluble nitrogen-containing compound selected from the group consisting of primary aromatic and aliphatic amines, secondary aliphatic amines, and ammonia, and recovering from the resultant reaction mixture the acetoacetyl amide thus produced.

8. Process for the production of an acetoacetyl amide, which comprises slowly introducing and intimately contacting diketene with an aqueous solution of a water-soluble primary amine, and recovering from the resultant reaction mixture the acetoacetyl amide thus produced.

9. Process for the production of an acetoacetyl amide, which comprises slowly introducing and intimately contacting diketene with an aqueous solution of a water-soluble primary aromatic amine, and recovering from the resultant reaction mixture the acetoacetyl amide thus produced.

10. Process for producing acetoacetyl amides, which comprises slowly introducing diketene into and quickly and intimately mixing and reacting the same with an aqueous dispersion of a nitrogen-containing compound selected from the group consisting of the primary aromatic and aliphatic amines, secondary aliphatic amines, end ammonia, while cooling the resultant reaction mixture, and separating from the latter the acetoacetyl amide thus produced.

11. Process for producing an acetoacetyl amide, which comprises slowly introducing diketene into and quickly and intimately intermixing the same with an aqueous dispersion of a nitrogen-containing compound selected from the group consisting of primary aromatic and aliphatic amines, secondary aliphatic amines, and ammonia, while maintaining the resultant reaction mixture at a temperature not substantially above atmospheric, and separately recovering from the said mixture the acetoacetyl amide thus produced.

12. Process for preparing bis-acetoacetyl o-tolidine, which comprises slowly introducing diketene into intimate contact with an aqueous suspension of o-tolidine, and separating from the resultant reaction mixture the bis-acetoacetyl o-tolidine thus produced.

13. Process for producing acetoacetyl morpholine, which comprises slowly introducing diketene into and quickly and intimately intermixing the same and an aqueous solution of morpholine, thereby reacting the diketene and morpholine, and separately recovering from the resultant reaction mixture the acetoacetyl morpholine thus produced.

14. Process for producing acetoacetyl morpholine, which comprises slowly introducing diketene into and quickly and intimately intermixing the same and an aqueous solution of morpholine, thereby reacting the diketene and morpholine, and distilling from the resultant reaction mixture under high vacuum and recovering the acetoacetyl morpholine thus produced.

15. Process for preparing diacetoacetyl ethylene diamine, which comprises reacting diketene with an aqueous solution of ethylene diamine, and separating from the resultant reaction mixture the diacetoacetyl ethylene diamine thus produced.

16. As a chemical compound, acetoacetyl morpholine, the same being a crystalline solid melting between 54° and 55° C., and being soluble in water, alcohols, ketones and esters, but insoluble in ethers.

17. As a chemical compound, diacetoacetyl ethylene diamine, the same being a crystalline compound melting between 168° and 169° C., and being sparingly soluble in water, alcohols, and ketones, and insoluble in ethers and hydrocarbons.

18. As a chemical compound, an acetoacetyl derivative of an amine selected from the group consisting of the primary aliphatic amines and the secondary aliphatic amines, the said compound being a crystalline solid, insoluble in ethers.

19. Process for the production of an acetoacetyl amide, which comprises slowly introducing diketene into while intimately mixing the same with an aqueous suspension of a solid water-insoluble amine in finely-divided form, the particles of which amine are sufficiently fine to pass through a 60-mesh screen, and recovering from the resultant reaction mixture the acetoacetyl amide thus produced, the said amine being selected from the group consisting of the primary aromatic amines and the primary and secondary aliphatic amines.

ALBERT B. BOESE, Jr.